United States Patent [19]

Moenkhaus et al.

[11] Patent Number: 5,000,222

[45] Date of Patent: Mar. 19, 1991

[54] TAMPER RESISTANT ADJUSTMENT RANGE CONTROL FOR THE ADJUSTMENT SCREW OF A CONTROL DEVICE

[75] Inventors: Patrick R. Moenkhaus, Mounds View; Edward Schwarz, Minneapolis, both of Minn.

[73] Assignee: Honeywell Inc., Minneapolis, Minn.

[21] Appl. No.: 502,072

[22] Filed: Mar. 30, 1990

[51] Int. Cl.$^5$ .................... F16K 17/00; F16K 35/00
[52] U.S. Cl. .................... 137/505.41; 29/890.124; 29/890.128; 29/DIG. 1; 37/15; 37/505.42; 251/284; 267/177; 411/82; 411/301; 411/910
[58] Field of Search .................... 137/505.41, 505.42, 137/15; 251/89, 95, 96, 285, 284; 267/177; 411/82, 301, 302, 334, 335, 336, 910, 937.2; 29/428, 469, 877, 890.12, 890.121, 890.124, 890.128, 890.129, 890.131, DIG. 1

[56] References Cited

U.S. PATENT DOCUMENTS

| | | | |
|---|---|---|---|
| 1,561,367 | 11/1925 | Spreen | 137/454.5 |
| 1,877,938 | 9/1932 | Moore | 251/285 |
| 2,558,292 | 6/1951 | Faller | 137/505.41 |
| 3,159,388 | 12/1964 | Wall | 137/505.42 |
| 3,419,247 | 12/1968 | Bosi | 251/285 |
| 3,603,214 | 9/1971 | Murrell | 267/177 |
| 3,747,629 | 7/1973 | Bauman | 137/505.41 |
| 3,805,863 | 4/1974 | Starr | 411/335 |
| 3,964,948 | 6/1976 | Busse | 411/82 |
| 4,621,658 | 11/1986 | Buezis | 137/505.41 |
| 4,915,557 | 4/1990 | Stafford | 411/82 |

FOREIGN PATENT DOCUMENTS

| | | | |
|---|---|---|---|
| 522489 | 9/1953 | Belgium | 137/505.42 |
| 1014563 | 12/1965 | United Kingdom | 137/505.41 |

*Primary Examiner*—George L. Walton
*Attorney, Agent, or Firm*—Edward Schwarz

[57] ABSTRACT

A pressure adjustment screw for a fluid flow control device cannot for safety's sake be rotated within a threaded cylindrical bore on the device's body to withdraw it beyond an extreme pressure level safety setting. To allow field adjustment of the set point pressure and at the same time to prevent withdrawal of the adjustment screw beyond the extreme pressure level safety setting, a stop collar is fixed within the cylindrical bore in a position contacting the adjustment screw when the adjustment screw is in its extreme pressure level safety setting. The invention includes a number of means for fixing the stop collar in this position, as do methods for fixing the stop collar in this position.

23 Claims, 2 Drawing Sheets

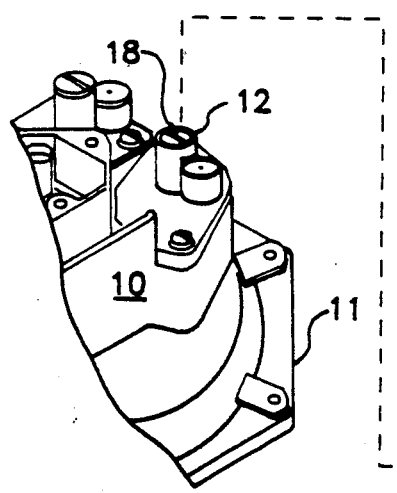
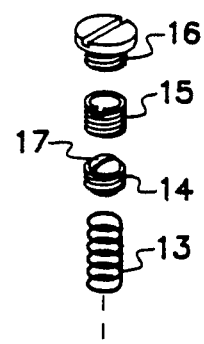
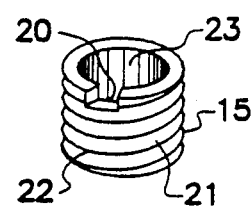
Fig. 1
Fig. 2
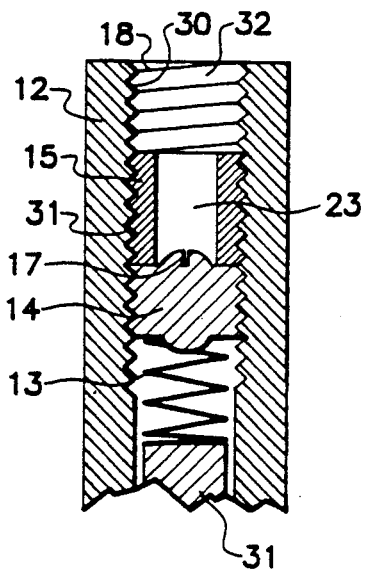
Fig. 3
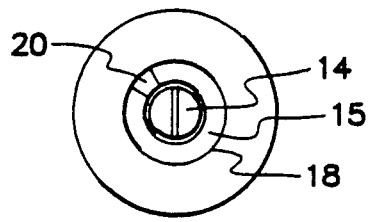
Fig. 4

TAMPER RESISTANT ADJUSTMENT RANGE CONTROL FOR THE ADJUSTMENT SCREW OF A CONTROL DEVICE

BACKGROUND OF INVENTION

Certain types of fluid flow control devices include a regulator which limits the maximum or minimum (extreme) level of some parameter of the fluid flow such as pressure or flow rate. A particular type of such a flow control device which is of interest here is a gas valve which has integral with it a regulator which maintains a preset minimum outlet pressure. However, the discussion which follows is applicable to applications for limiting maximum pressure, to fluids different from the types mentioned (including liquids), and to flow parameters other than pressure. It is preferable for certain applications that the installer be able to adjust the setpoint of the regulator so that the extreme parameter value modulated by the regulator conforms to the requirements of the system in which it is installed.

In the type of gas valve mentioned in the above paragraph, the setpoint pressure of the pressure regulator is adjustable by the setting of an adjustment screw within a cylindrical bore on the body of the valve. The interior wall of the cylindrical bore is threaded to match the adjustment screw's threads. By rotating the adjustment screw in one direction to advance it further into the bore or in the other to withdraw it from within the bore, the minimum pressure setting of the regulator may be respectively reduced or increased.

It is important when dealing with certain types of fluids such as natural gas or propane (liquid petroleum) to assure at all times that the pressure of the gas at the outlet port of the control device is above an absolute minimum value regardless of the requirements of the installation. If this minimum pressure is not always present, it is possible that unsafe operation of the burner receiving the gas flow will result. For example, it is necessary for safe operation of a natural gas burner that the outlet pressure never fall below approximately 0.03 psig (200 Pascals). For propane, the outlet pressure should never fall below 0.05 psig (350 Pascals).

It is necessary that the adjustment screw be accessible in the field so that the installer can set the minimum pressure to an optimum value higher than the absolute minimum value for the fluid to conform the value to the requirements of the system for economical and efficient operation. Pressures lower than this optimal value (but above the absolute minimum value) are safe but just not as desirable. By providing the installer with this adjustment option, it is possible to stock fewer valves for a given capacity for example, thereby lowering overall cost for providing the valves of various types.

On occasion, it has been found that the pressure adjustment screw of such valves will be positioned outwardly past the extreme withdrawn safety setting, causing the outlet pressure to be too low for safe operation. It is therefore preferable that there be some mean for preventing incorrect adjusting of the adjustment screw which results in excessively low outlet pressure.

One possible means for accomplishing this is to mold a feature such as a shoulder in the interior of the cylindrical wall to prevent withdrawal of the adjustment screw past the extreme withdrawn safety setting. Unfortunately, the tolerances of the parts from which these pressure regulators are made, and the assembly process, are not so precise and repeatable as to allow such a fixed position feature to reliably and inexpensively reproduce the low pressure set point in a production setting. Other approaches also seem to have serious cost or reliability penalties. Accordingly, there is a substantial need for a means for limiting the setting of the adjustment screw to prevent it from being withdrawn past the extreme withdrawn safety setting establishing the minimum outlet pressure of the valve.

BRIEF DESCRIPTION OF THE INVENTION

It is possible to control the setting of such an adjustment screw to prevent its outward withdrawal past an extreme withdrawn safety setting by employing a tubular stop collar whose external shape closely matches the internal shape of the cylindrical bore. This stop collar has an axial bore extending through the entire length of the stop collar. The stop collar is locked in a required position within the cylindrical bore so as to make contact with the adjustment screw when said adjustment screw is in its extreme withdrawn safety setting. The stop collar is locked in this required position within the cylindrical bore by locking means which may take any of a number of different forms.

Where the stop collar is threaded to mate with the internal threads of the cylindrical bore, the stop collar locking means can comprise a bonding agent which occupies space between the threads of the stop collar and the threads of the cylindrical bore. It is also possible to lock the stop collar with a permanently installed locking pin which at least partly penetrates each of the stop collar and the wall of the cylindrical bore.

The various methods suitable for locking the stop collar in position all include the step of first positioning the adjustment screw at its extreme withdrawn safety setting. Where a bonding agent is used with a threaded stop collar, the bonding agent is applied to either the threads of the stop collar or to the cylindrical bore. The bonding agent should be one that sets after a finite interval responsive to mechanical pressure. Then after positioning the adjustment screw at its extreme withdrawn safety setting, the stop collar is engaged with the cylindrical bore's threads and is rotated until the stop collar contacts the adjustment screw. Where a locking pin is used, the locking pin may be pressed through the wall of the cylindrical bore and into the stop collar after the stop collar has been positioned in its required position.

Accordingly, one purpose of this invention is to prevent an adjustment screw from being rotated into an unsafe position.

Yet another purpose is to make it extremely difficult for anyone who wishes to tamper with the means restraining one from moving the adjustment screw into an unsafe position.

Yet another purpose is to provide a visible indication of any attempts to so tamper with the means preventing unsafe positioning of the adjustment screw.

Yet another purpose is to provide the above capabilities simply and inexpensively.

Other purposes and features will be apparent from the description of the invention following.

BRIEF DESCRIPTION OF THE DRAWINGS

FIG. 1 is a a perspective view of a valve body incorporating a generalized embodiment of the invention.

FIG. 2 is a perspective view of a preferred stop collar incorporating the features of the invention.

FIG. 3 is a section view of the portion of the valve body of FIG. 1 incorporating one embodiment of the invention.

FIG. 4 is a top view of the portion of the valve body incorporating the invention.

DESCRIPTION OF THE PREFERRED EMBODIMENTS

Figure 5:
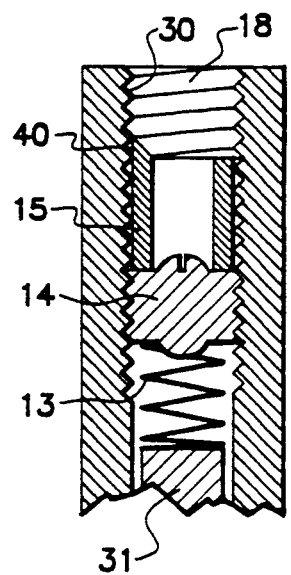
FIGS. 5, 6, and 8 are section views of alternative embodiments incorporating the invention.

This improved adjustment screw range stop is in one preferred embodiment used to control the minimum pressure available at the outlet port of a pressure regulator in a gas valve 10, the relevant part of which is shown in FIG. 1. The invention is, however, applicable to a wide variety of fluid flow and even other types of control devices where a parameter such as pressure or flow rate must be kept either above or below a particular value.

With reference to FIGS. 1-3, therein is shown a projection 12 formed on the body 11 of valve 10 and a cylindrical bore formed within projection 12. In a preferred embodiment, there are formed on the interior wall 30 of bore 18, threads 32 shown most clearly in FIG. 3. A pressure controlling spring 13 in the bottom of cylindrical bore 18 bears against a pressure regulating plunger 31 (shown in FIG. 3). The adjustment screw 14 previously mentioned has threads matching the internal threads 18 of bore 18 which are engaged within bore to control the position of the end of spring 13. Screw 14 has a slot 17 for screwdriver adjustment so that the force applied to plunger 31 can be easily adjusted over a control range by rotating screw 14 to advance it into or to withdraw it from bore 18 with such rotation. As mentioned earlier, outlet pressure from the regulator increases with advancing of the screw 14 into bore 18.

The improved stop function for the allowable range over which screw 14 may b is provided by a stop collar 15 which is shown in FIGS. 1-3 as having on its exterior surface 21, threads 22 matching the internal threads of bore 18 so that collar 15 can be threaded into bore 18. Stop collar 15 may include a torque transmitting feature shown as slot 20 for mating with an adjustment tool such as a special screwdriver (not shown) to facilitate threaded rotation of collar 15 into bore 18. Stop collar 15 further includes an axial bore 23 through which may be passed a screwdriver blade for access to adjustment screw 14 and its slot 17. The adjustment elements within bore 18 are further enclosed against dust and contamination with a dust cover 16 which threads into the top of bore 18.

The threads 22 in the preferred embodiment are coated with a bonding agent which in FIG. 3 can be assumed to occupy the minute spaces between the threads 32 of bore 18 and the threads 22 of stop collar 15 such as is generally indicated by ref. no. 31. In the commercial embodiment which employs this invention, the preferred bonding agent is a material having the trade name "Dri-Loc" (registered mark) and available from Loctite Corporation, Newington, Conn., 06111. The Dri-Loc bonding agent is applied to threads by a proprietary process of Loctite Corporation, as explained in the Technical Data Sheet for Formula No. 200 through 204 and dated Dec. '87. This Dri-Loc bonding agent is activated responsive to mechanical pressure such as that generated by rotating stop collar 15 during insertion into bore 18. The bonding agent sets after a finite interval (typically a few minutes) after activation, locking the stop collar 15 into whatever position it occupies at the time of setting.

To locate stop collar 15 in its required position, it is most convenient to first set adjustment screw 14 at its extreme withdrawn safety setting, i.e. the position closest to the outer end of bore 18 at which screw 14 may be placed for safe operation. In the manufacturing environment, this setting will be determined by measuring the regulator pressure set point in actual operation and adjusting adjustment screw 14 until the extreme withdrawn safety setting is reached. Then stop collar 15 is threaded into the threads 32 of bore 18 and rotated into contact with adjustment screw 14 which is also its required position. When the bonding agent has set, it will no longer be possible to withdraw adjustment screw 14 past its extreme withdrawn safety setting because it is stopped by stop collar 15. If a user attempts to remove stop collar 15, the threads 32 and interior walls 30 of bore 18 will in all likelihood be damaged, thereby revealing the tampering. At the same time the axial bore 23 of stop collar 15 allows screwdriver access to slot 17 of adjustment screw 14 so that adjustment screw 14 can be rotated into any desired safe location within bore 18. In this way, field adjustment for pressures in excess of the minimum safety pressure is possible. This avoids the necessity of stocking a number of different valves having different preset outlet pressures of the internal regulator, as previously mentioned.

There are a number of alternative embodiments which may be used to lock stop collar 15 in its required position of contacting adjustment screw 14 while screw 14 is in its extreme withdrawn safety setting. FIG. 5 shows a stop collar 15 having no external threads and whose external diameter closely conforms to the internal walls 30 of bore 18. To retain stop collar 15 in its required position, collar 15 is designed with a wall portion 40 which will permanently deform under compressive load. A clamp or vise, the characteristics of which are not important, is pressed against this wall portion 40 to cause wall portion 40 to deform under compressive load against the interior wall 30 and threads 32 of bore 18 until the wall portion 40 flows into interference fit with the threads. For secure retention of collar 15 in its required position it is likely that a number of such wall portions 40 will be required on collar 15, and that each of these wall portions will have to be deformed under such compressive load to form the interference fit between the wall portion 40 and the threads 32.

Figure 6:
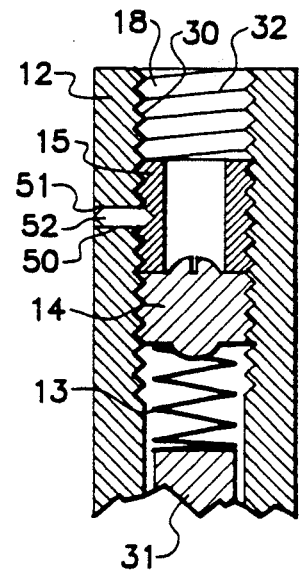

Yet another embodiment is shown in FIG. 6. In this embodiment stop collar 15 is threaded to match threads 32 within cylindrical bore 18. Collar 15 is immobilized in the required position by a locking pin 50. The locking pin 50 is permanently installed and at least partly penetrates each of the wall 30 of the bore 18 and the stop collar 15. In one preferred embodiment pin 50 is in interference fit with at least one of the wall 51 and stop collar 15. The interference fit is one way to thwart an attempt to remove pin 50 to allow rotation of stop collar 15 to a different position.

In one preferred embodiment projection 12 is formed of aluminum. Locking pin 50 is formed of steel or other material harder than the material of projection 12 and has a conical or pointed exterior end 52. An attempt to drill out pin 50 will result in the drill bit slipping or walking off the end of pin 50 and drilling instead in the softer aluminum of projection 12.

Figure 7:
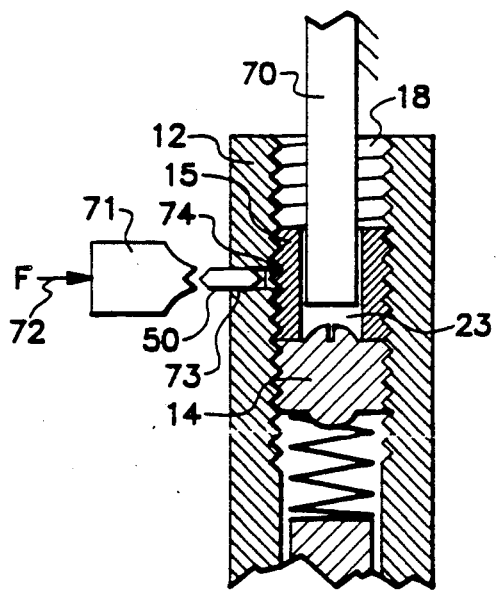
FIG. 7 shows a section view of the portion of the valve body incorporating one embodiment of the invention at a point intermediate in the process by which the embodiment of the invention shown in FIG. 6 is created.

With the aid of FIG. 7, a preferred method for installing the pin 50 shown in FIG. 6 can be described. A hole 73 is drilled at least partially through the wall of projection 12. The stop collar 15 is then threaded into the threads of bore 18 and rotated into its required position. A mandrel 70 is then inserted into the axial bore 23 of stop collar 15. The pin 50 is inserted in the hole 73 and a die 71 whose end conforms with the end of pin 50 is used to drive pin 50 through any material 74 which remains at the bottom of hole 73, and further drives pin 50 into collar 15 to the position shown in FIG. 6 The material 74 at the bottom of hole 73 will smear across the interface with collar 15 to immobilize collar 15 even should pin 50 be withdrawn from hole 73. By creating a slight taper on pin 50 an interference fit between the walls of hole 73 and pin 50 will be created to effectively immobilize pin 50 within projection 12 and stop collar 15 to resist tampering with its position at some later time. Mandrel 70 prevents deformation of projection 12 so that adjustment screw 14 will easily turn during later adjustment.

Figure 8:
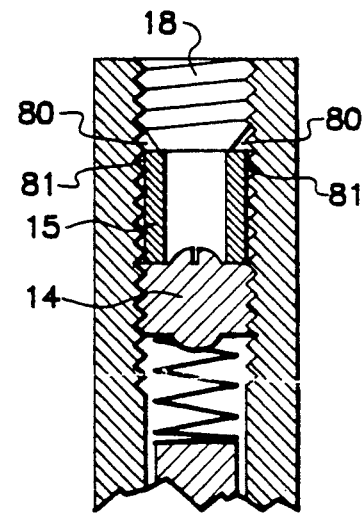

Another embodiment shown in FIG. 8 employs an unthreaded stop collar 15 which has a small amount of epoxy or other bonding agent which adheres to the material of stop collar 15. This bond agent is placed on the outer surfaces of stop collar 15 before or after insertion into bore 18. Stop collar 15 is then slid to its required position and bonding agent remaining on the stop collar 15 will immobilize it within opening 18. Upon final positioning the epoxy occupies the areas generally indicated by reference numerals 80 and 81 to thereby immobilize stop collar 15 within bore 18. At the present time this embodiment is less preferable than those previously discussed because of the potential of the bonding agent migrating to adjustment screw 14, with the possibility that adjustment screw 14 will be frozen in the position shown and adjustment to increase the outlet pressure will be difficult or impossible. However, there may be bonding agents unknown to us now or which are developed in the future which resist such migration and which will be suitable for such use.

Having thus described our invention, what we claim is:

1. In a fluid flow control device of the type including a pressure regulator whose set point pressure is adjustable by the setting of an adjustment screw within a cylindrical bore, the interior of whose wall is threaded to match the adjustment screw's threads, said adjustment screw having an extreme withdrawn safety setting beyond which for safe operation the adjustment screw may not be withdrawn, an improvement for preventing withdrawal of the adjustment screw past the extreme withdrawn safety setting, including
   (a) a tubular stop collar whose external shape closely matches the internal shape of the cylindrical bore, said stop collar having an axial bore extending through the entire length of the stop collar, said stop collar being positioned within the cylindrical bore and being in contact with the adjustment screw only when said adjustment screw is in its extreme withdrawn safety setting; and
   (b) means for permanently locking the stop collar in position within the cylindrical bore to thereby prevent any change in the stop collar's position.

2. The improved fluid flow control device of claim 1, wherein the means for locking the stop collar comprises a permanently installed locking pin at least partly penetrating each of the wall of the cylindrical bore and the stop collar, and in interference fit with at least one of the wall of the cylindrical bore and the stop collar.

3. The improved fluid flow control device of claim 1, wherein the means for locking the stop collar comprises a permanently installed locking pin penetrating the wall of the cylindrical bore and extending to penetrate into the stop collar.

4. The improved fluid flow control device of claim 3, wherein the end of the locking pin external with respect to the axis of the cylindrical bore is pointed.

5. The improved fluid flow control device of claim 4, wherein the locking pin penetrates the wall of the cylindrical bore and at least partly penetrates the stop collar, and is in interference fit with at least one of the wall of the cylindrical bore and the stop collar.

6. A method for manufacturing the improved fluid flow control device of claim 3, comprising the steps of
   (a) positioning the adjustment screw at its extreme withdrawn safety setting;
   (b) inserting the stop collar into the cylindrical bore and in contact with the adjustment screw; and
   (c) pressing the locking pin into both the stop collar and the wall of the cylindrical bore.

7. The method of claim 6, further comprising the steps of
   (a) forming a projection on the body of the fluid control device; and
   (b) drilling a hole in the projection along the length thereof to form the cylindrical bore; and wherein the locking pin pressing step further comprises
   (c) drilling a locking pin hole from the outside of the projection at right angles to the axis of the cylindrical bore, and at least partly extending through the projection toward the cylindrical bore; and
   (d) inserting the locking pin in the locking pin hole.

8. The method of claim 7, wherein the locking pin hole drilling step further comprises the step of drilling the locking pin hole only partially through to the wall of the cylindrical bore, and wherein the locking pin pressing step further comprises pressing the locking pin through the material remaining at the bottom of the hole and into the stop collar.

9. The improved fluid flow control device of claim 1, wherein the stop collar is threaded to mate with the internal threads of the cylindrical bore.

10. The improved fluid flow control device of claim 9, wherein the stop collar includes a torque transmitting feature for mating with an adjustment tool, by which the position of the stop collar within the cylindrical bore may be set.

11. The improved fluid flow control device of claim 9, wherein the stop collar locking means comprises a bonding agent occupying space between the threads of the stop collar and the threads of the cylindrical bore.

12. A method for positioning the stop collar of claim 11, including the steps of
   (a) positioning the adjustment screw at its extreme withdrawn safety setting;
   (b) applying in its unset state to the threads of one of the stop collar and the cylindrical bore between its outer end and the adjustment screw, a bonding agent which sets after a finite interval responsive to mechanical pressure; and (c) after positioning the adjustment screw at its extreme withdrawn safety setting, engaging the stop collar threads with the cylindrical bore's threads and rotating the stop collar until the stop collar contacts the adjustment screw.

13. The method of claim 12, wherein the step of applying the bonding agent comprises the step of applying the bonding agent to the threads of the stop collar.

14. The improved fluid flow control device of claim 1, wherein the means for locking the stop collar comprises adhesive between the interior surface of the cylindrical bore and the exterior surface of the stop collar.

15. The improved fluid flow control device of claim 1, wherein the stop collar locking means includes a wall portion which permanently deforms under compressive load, said wall portion in interference fit with the thread in the cylindrical bore.

16. A method for manufacturing the improved fluid flow control device of claim 15, comprising the steps of
   (a) positioning the adjustment screw at its extreme withdrawn safety setting;
   (b) inserting the stop collar into the cylindrical bore and in contact with the adjustment screw; and
   (c) pressing the wall portion of the stop collar which deforms under compressive load against the interior of the cylindrical bore until the wall portion flows into interference fit with the cylindrical bore's threads, with the stop collar in contact with the adjustment screw in its extreme withdrawn safety setting.

17. A method for manufacturing the improved fluid flow control device of claim 1, comprising the steps of
   (a) positioning the adjustment screw at its extreme withdrawn safety setting;
   (b) inserting the stop collar into the cylindrical bore and in contact with the adjustment screw; and
   (c) locking the stop collar in the cylindrical bore in contact with the adjustment screw in its extreme withdrawn safety setting.

18. In a fluid flow control device of the type including a pressure regulator whose set point pressure is adjustable by the setting of an adjustment screw within a cylindrical bore, the interior of whose wall is threaded to match the adjustment screw's threads, said cylindrical bore having an end through which access to the adjustment screw may be had, said adjustment screw having an extreme withdrawn safety setting beyond which for safe operation the adjustment screw may not be withdrawn, an improvement for preventing withdrawal of the adjustment screw past the extreme withdrawn safety setting, including
   (a) a tubular stop collar whose external shape closely matches the internal shape of the cylindrical bore, said stop collar having an axial bore extending through the entire length of the stop collar, said stop collar being positioned within the cylindrical bore between the cylindrical bore's end and the adjustment screw, said stop collar being in contact with the adjustment screw only when said adjustment screw is in its extreme withdrawn safety setting; and
   (b) means for permanently locking the stop collar in position within the cylindrical bore to thereby prevent any change in the stop collar's position.

19. The improved fluid flow control device of claim 18, wherein the means for locking the stop collar comprises a permanently installed locking pin penetrating through the wall of the cylindrical bore and extending to penetrate into the stop collar.

20. The improved fluid flow control device of claim 19, wherein the end of the locking pin external with respect to the axis of the cylindrical bore is pointed.

21. The improved fluid flow control device of claim 19, wherein the stop collar is threaded to mate with the internal threads of the cylindrical bore.

22. A method for manufacturing the improved fluid flow control device of claim 19, comprising the steps of
   (a) positioning the adjustment screw at its extreme withdrawn safety setting;
   (b) inserting the stop collar into the cylindrical bore and in contact with the adjustment screw; and
   (c) pressing the locking pin into both the stop collar and the wall of the cylindrical bore.

23. The improved fluid flow control device of claim 18, wherein the stop collar locking means comprises a bonding agent occupying space between the threads of the stop collar and the threads of the cylindrical bore.

* * * * *